United States Patent
Chen

(10) Patent No.: US 8,713,337 B2
(45) Date of Patent: Apr. 29, 2014

(54) POWER MANAGEMENT METHOD FOR REDUCING POWER OF HOST WHEN TURNING OFF MAIN MONITOR AND COMPUTER SYSTEM APPLYING THE SAME

(75) Inventor: Hsiao-Wen Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 421 days.

(21) Appl. No.: 12/897,792

(22) Filed: Oct. 5, 2010

(65) Prior Publication Data
US 2011/0154074 A1    Jun. 23, 2011

(30) Foreign Application Priority Data
Dec. 22, 2009  (TW) ............................. 98144327 A

(51) Int. Cl.
*G06F 1/32* (2006.01)
(52) U.S. Cl.
USPC ............ 713/320; 713/322; 713/323; 713/324
(58) Field of Classification Search
USPC ........................ 713/320, 321, 322, 323, 324
See application file for complete search history.

(56) References Cited

U.S. PATENT DOCUMENTS

| 5,579,252 | A | 11/1996 | Huang |
| 5,764,547 | A * | 6/1998 | Bilich et al. ................... 713/321 |
| 7,971,085 | B2 * | 6/2011 | Kim .............................. 713/324 |
| 7,992,026 | B2 * | 8/2011 | Eade et al. ..................... 713/324 |
| 2003/0051182 | A1 * | 3/2003 | Tsirkel et al. ................. 713/320 |
| 2007/0288782 | A1 | 12/2007 | Chang et al. |

FOREIGN PATENT DOCUMENTS

| CN | 1624624 | 6/2005 |
| CN | 101241246 | 8/2008 |
| CN | 101685337 | 3/2010 |
| TW | 200638216 | 11/2006 |
| TW | 200727695 | 7/2007 |

* cited by examiner

*Primary Examiner* — Dennis M Butler
(74) *Attorney, Agent, or Firm* — Jianq Chyun IP Office

(57) ABSTRACT

A power management method adapted in a computer system is provided. The computer system includes a main monitor and a host. A management method includes the following steps. First, whether the main monitor is turned off or not is determined. When the main monitor is turned off, a power saving program is executed to reduce the power of the host. Furthermore, a computer system applying the above power management method is also provided.

10 Claims, 3 Drawing Sheets

POWER MANAGEMENT METHOD FOR REDUCING POWER OF HOST WHEN TURNING OFF MAIN MONITOR AND COMPUTER SYSTEM APPLYING THE SAME

CROSS-REFERENCE TO RELATED APPLICATION

This application claims the priority benefit of Taiwan application serial no. 98144327, filed on Dec. 22, 2009. The entirety of the above-mentioned patent application is hereby incorporated by reference herein and made a part of this specification.

BACKGROUND OF THE INVENTION

1. Field of the Invention

The invention relates to a power management method and, more particularly, to a power management method of a computer system.

2. Description of the Related Art

Power management is an important function of a desktop computer and a portable peripheral device (such as a notebook), which needs a battery to provide power. At present, most of the computer systems support advanced configuration and power interface (ACPI) standard to manage the power. In the ACPI, an operating system, instead of a basic input output system (BIOS), generates a command to manage the power according to the interaction between the user and the operating system. Thus, the efficiency of the power source management is increased. The ACPI distributes the power to the system components effectively. Cooperating with hardware detecting information such as the temperature of a mother board, the speed of a fan, the voltage of a power supply, a proper voltage and a host operating frequency are provided to save power and improve the efficiency.

Under the management of the ACPI, the computer system can operate under different power states such as S0, S1, S2, S3 (suspend to RAM), S4 (hibernate, suspend to disk), S5 (soft off) according to different requirements. For example, under the S0 state, all of the hardware and the peripheral devices operate. Under the S1 state, the central processor unit (CPU) stops operations to reduce the power consumption of the CPU. Under the S2 state, the CPU is turned off. Under the S3 state, only the memory device has power to save power and prevent the operating system state stored in the memory from losing when power off. When back to the S0 state, the operating system can restore the operating system state quickly by accessing the memory device. Under the S4 state, the operating system state stored in the memory device under the S3 state is stored to a hard disk, and then the operating system is turned off. Under the S5 state, the computer system is turned off without storing the operating system state.

Furthermore, under the S0 state, when the system is idle, the user can set whether the main monitor is turned off automatically in settings of the system power management configuration. For example, the turn-off time of the main monitor can be set to be "one minute", "none" and so on. Since it saves the power when the main monitor is turned off, some users would not select "none", and they may set the main monitor to be power off after the system is idle for a certain time.

BRIEF SUMMARY OF THE INVENTION

The invention provides a power management method and a computer system applying the same which can reduce the power of the computer system.

The invention provides a power management method adapted to computer system, and the computer system includes a main monitor and a host. The power management method includes the following steps. First, whether the main monitor is turned off or not is determined. When the main monitor is turned off, a power saving program is executed to reduce the power of the host.

In an embodiment of the invention, after determining whether the main monitor is turned off or not and before executing the power saving program, the power management method further includes determining whether to execute the power saving program.

In an embodiment of the invention, the step of determining whether to execute the power saving program include the following steps. First, detecting a load state of the host; second, determining whether to execute the power saving program according to the load state. When the load state exceeds a preset value, the power saving program is not executed.

In an embodiment of the invention, the step of determining whether to execute the power saving program include the following steps. First, whether a display signal generated by the host is outputted to an external monitor is determined. When the display signal is outputted to the external monitor, the power saving program is not executed.

In an embodiment of the invention, the step of determining whether the main monitor is turned off or not includes determining whether the main monitor continues off over a preset time.

In an embodiment of the invention, the power saving program and the step of turning off of the main monitor are executed simultaneously.

In an embodiment of the invention, the step of executing the power saving program at least includes one of the following steps: reducing the operating frequency of a central processing unit (CPU) of the host; reducing the operating voltage of the CPU; reducing the operating frequency of a chipset of the host; and turning off the power source of a peripheral device of the host.

The invention further provides a computer system, including a main monitor and a host. The host includes an embedded controller coupled to the main monitor to determine whether the main monitor is turned off or not. When the embedded controller determines that the main monitor is turned off, a power saving program is executed to reduce the power of the host.

In an embodiment of the invention, after determining whether the main monitor is turned off or not and before executing the power saving program, the embedded controller is further used for determining whether to execute the power saving program.

In an embodiment of the invention, the embedded controller determines whether to execute the power saving program according to a load state of the host. When the embedded controller determines that the load state exceeds a preset value, the power saving program is not executed.

In an embodiment of the invention, the host further includes a display chip. The display chip is coupled to the main monitor and the embedded controller, the display chip is used for outputting a display signal to the main monitor or an external monitor. The embedded controller determines whether the display signal is outputted to the external monitor or not. When the display signal is outputted to the external monitor, the embedded controller does not execute the power saving program.

In an embodiment of the invention, the embedded controller executes the power saving program after determining that the main monitor continues off over a preset time.

In an embodiment of the invention, the embedded controller executes the power saving program simultaneously when the main monitor is turned off.

In an embodiment of the invention, the host further includes a central processing unit (CPU), a chipset and a peripheral device. The CPU, the chipset and the peripheral device are coupled to the embedded controller. When the embedded controller executes the power saving program, at least one of the following steps is executed: reducing the operating frequency of the CPU; reducing the operating voltage of the CPU; reducing the operating frequency of the chipset; and turning off the power source of the peripheral device.

As stated above, the invention determines whether to execute the power saving program by determining whether the main monitor is turned off or not, so as to reduce the system consumption effectively and save the power.

These and other features, aspects and advantages of the present invention will become better understood with regard to the following description, appended claims, and accompanying drawings.

DETAILED DESCRIPTION OF THE EMBODIMENTS

Figure 1:
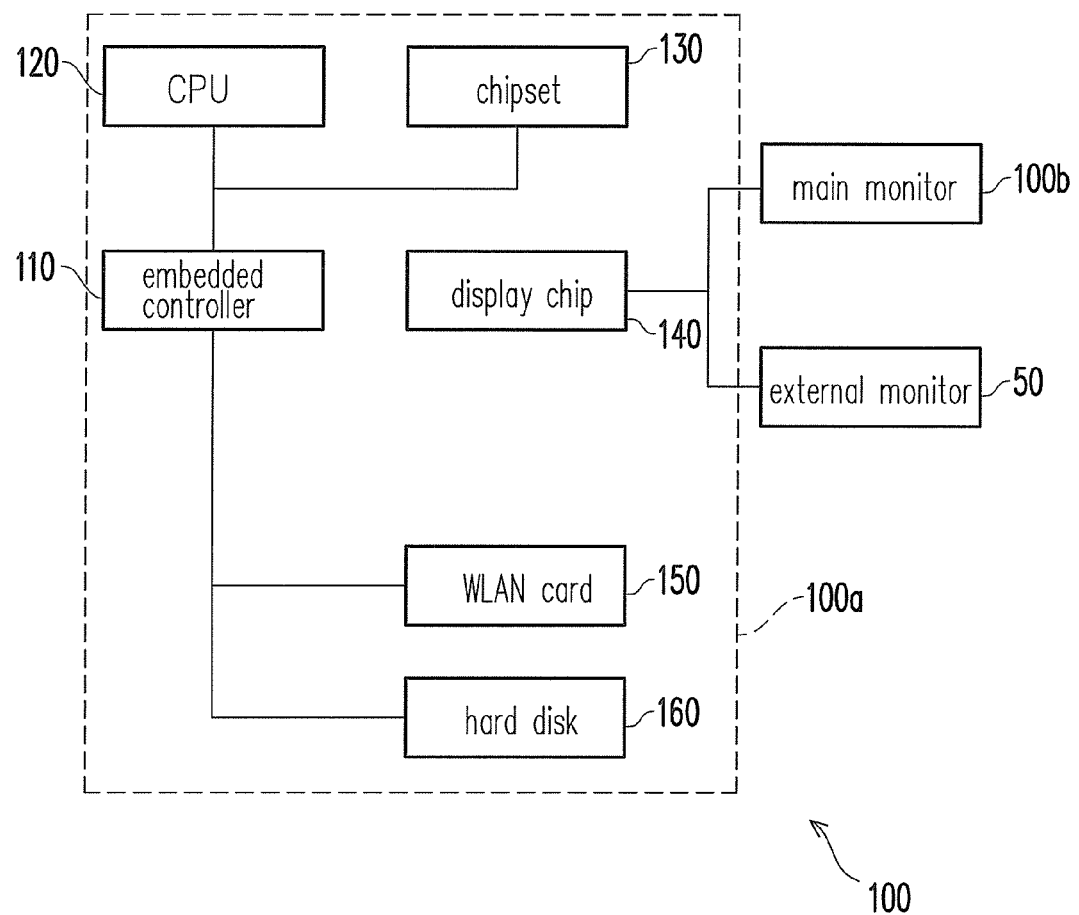
FIG. 1 is a block diagram showing a computer system in an embodiment of the invention.

FIG. 1 is a block diagram of a computer system in an embodiment of the invention. A computer system 100 includes a host 100a and a main monitor 100b. The host 100a mainly includes an embedded controller 110 coupled to the main monitor 100b. When the embedded controller 110 determines that the main monitor 100b is turned off, the embedded controller 110 executes a power saving program to reduce the power of the host 100a.

In the embodiment, the computer system 100, such as a notebook computer, further includes a central processing unit (CPU) 120, a chipset 130, a display chip 140, a wireless local area network (WLAN) card 150 and a hard disk 160. The CPU 120, the chipset 130, the display chip 140, the WLAN card 150 and the hard disk 160, for example, are all coupled to the embedded controller 110 to be under the power source management of the embedded controller 110. The display chip 140 is coupled between the main monitor 100b and the embedded controller 110 to allow the embedded controller 110 to be coupled to the main monitor 100b via the display chip 140. However, the coupled relationship between the components in the embodiment is just an example for illustrating the power source management of the embedded controller 110. The invention is not limited thereto.

Figure 2:
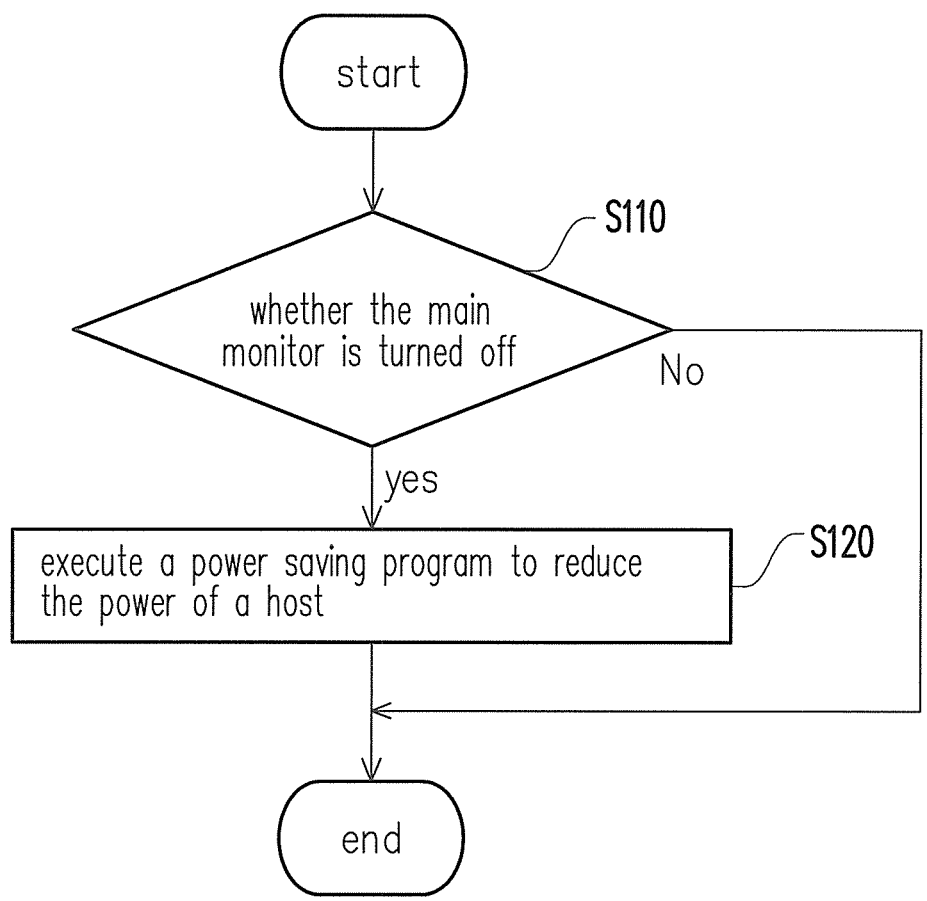
FIG. 2 is a flowchart showing a power management method of a computer system applied in the computer system in FIG. 1.

FIG. 2 is a flowchart of a power management method applied in the computer system in FIG. 1. First, step S110 is executed. The embedded controller 110 determines whether the main monitor 100b is turned off or not. Generally speaking, under the S0 state, the main monitor 100b is turned off under the following situations. For example, the user sets the main monitor 100b to be turned off after the system is idle for one minute in the system power source management configuration. When the user stops using the mouse (not shown) or the keyboard (not shown) and the system is idle for one minute, the embedded controller 110 turns off the main monitor 100b. Furthermore, the user also may turn off the main monitor 100b before he or she leaves the computer system 100. Under the two situations above, the embedded controller 110 determines that the main monitor 100b is turned off.

When the embedded controller 110 determines that the main monitor 100b is turned off, step S120 is executed. Namely, the embedded controller 110 executes a power saving program to reduce the power of the host 100a. In the embodiment, when the main monitor 100b is turned off, the power saving program is executed simultaneously.

Moreover, since the user may leave the computer system 100 just for a while, he or she may go on to use the computer system 100 shortly. Thus, in another embodiment not shown, before the embedded controller 110 executes the power saving program, the power management method determines whether the main monitor continues off over a preset time. As a result, the power saving program would not be executed and be closed repeatedly in the preset time. The power saving program can be set to be executed simultaneously or with a delay by the user, or it may be preset by the system manager or the developer.

Figure 3:
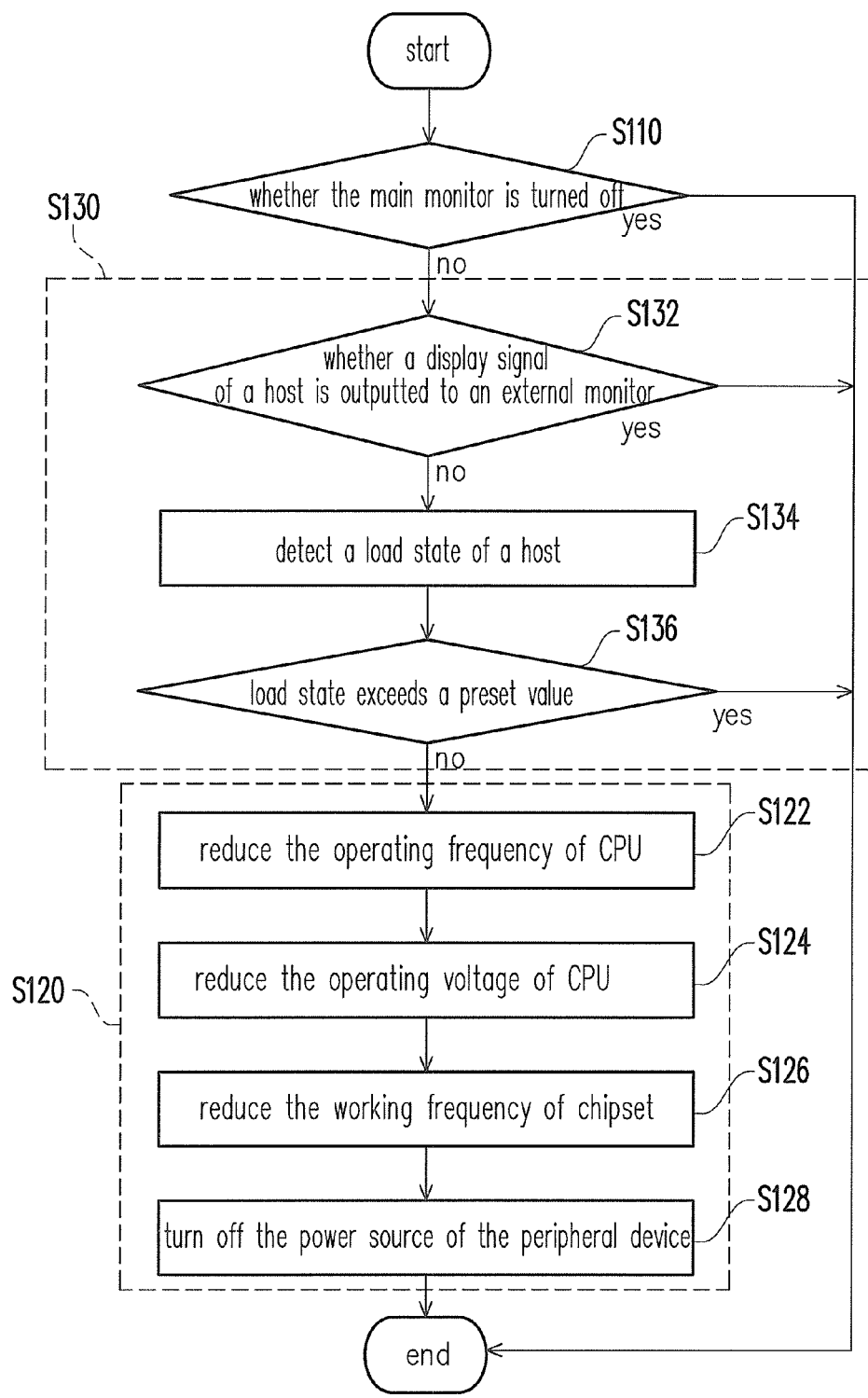
FIG. 3 is a flowchart showing the detailed steps of the power management method in FIG. 2.

FIG. 3 is flowchart showing the detailed steps of the power management method in FIG. 2. As shown in FIG. 1 and FIG. 3, after determining whether the main monitor 100b is turned off or not and before executing the power saving program, step S130 may be further executed. Step S130 includes three sub-steps S132 to S136. First, the embedded controller 110 determines whether a display signal generated by the display chip 140 is outputted to an external monitor 50. For example, when the user connects the host 100a to the external monitor 50, or connects the host 100a to a projector (not shown) to give a presentation, the display chip 140 outputs the display signal to the external monitor 50 or the projector according to the switch of the user. At the moment, the embedded controller 110 does not execute the power saving program to prevent from affecting the operations or the presentation cooperating with the external monitor 50 or the projector.

Additionally, if the embedded controller 110 determines that the display signal of the display chip 140 is not outputted to the external monitor 50, step S134 is executed. Namely, a load state of the host 100a is detected. In detail, the load state of the host 100a can be determined according to the utilization of the CPU 120. Then, step S136 is executed. The embedded controller 110 determines whether the load state exceeds a preset value. For example, if the utilization of the CPU 120 is higher than a certain ratio, the load state is determined to exceed the preset value, which means that the computer system 100 still processes a work such as a program or a media file although the user does not do any operation to the computer system 100. At the moment, the embedded controller 110 does not execute the power saving program to maintain the working efficiency of the computer system 100.

In another embodiment not shown, the load state of the host 100a can be detected according to whether the hard disk 160 or other peripheral devices are busy or not. Moreover, other determination steps may be added to step S130 to allow the power saving program to be executed under proper conditions. The embodiment is not limited thereto, and the execution conditions and the order of the steps can be adjusted according to requirement.

Relatively, if the load state does not exceed the preset value, it means that the computer system 100 is idle, and step S120 can be executed to execute the power saving program. In the embodiment, the power saving program may include four sub-steps S122 to S128 which can be adjusted according to the requirement of the system manager or the developer, and the invention is not limited thereto.

First, step S122 is executed to reduce the operating frequency of the CPU 120. Second, step S124 is executed to reduce the operating voltage of the CPU 120. Third, step S126 is executed to reduce the operating frequency of the chipset 130. For example, the frequency of the chipset 130 including a north bridge chip, the frequency of the north bridge chip is reduced by reducing the frequency of the front side bus (FSB). Fourth, step S128 is executed to turn off the power source of the peripheral device. For example, the power source of the WLAN card 150 and the hard disk 160 is turned off. In the embodiment, the WLAN card 150 can be a Wi-Fi or a 3.5G network card.

When the user uses the mouse, the keyboard or turns on the main monitor 100b again, the power saving program may be closed automatically, and the operating frequency, the voltage, the power supply of the CPU 120 and other components are adjusted to the original setting value to restore the efficiency of the system.

In order to illustrate the power saving effect of the power saving program in practice, the model S101H of the EeePC is taken as an example. In the system power source management configuration, the turn-off time of the main monitor is set to be "one minute" to enter the power saving state S0.

| S101H, AC In@ 110 V, 60 Hz | |
|---|---|
| In S0 state, the system is idle | 11 W |
| In S0 state, the main monitor is turned off | 8.2 W |
| In S0 state, the main monitor is turned off, and the power saving program is executed | 6.75 W |

The above table shows a power comparison of the model S101H of the EeePC under the S0 state. The system power is 11 W when it is idle under the S0 state. After the system is idle for one minute, the main monitor is turned off, and the power under the S0 state is 8.2 W. That is, comparing with the idle system, when the main monitor is turned off, the power is reduced by 2.8 W, which is about 25%.

In addition, if a power saving program is executed when the main monitor is turned off, 1.45 W further can be saved, which is about 18%. Comparing to the power of the idle system under the S0 state, 4.25 W is saved, which is about 38%. As a result, the power consumption is reduced, and the energy is saved.

In sum, whether the main monitor is turned off is determined to determine whether to execute the power saving program to reduce the system consumption and save power. Moreover, before executing the power saving program, whether to execute the power saving program may be further determined to prevent the operations from being interrupted and maintain the efficiency.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A power management method adapted to a computer system with a main monitor and a host, wherein the computer system operates under different power states, and the power management method comprising:

determining whether the main monitor is turned off or not;

when the main monitor is turned off, determining whether to execute a power saving program; and when the power saving program is determined to be executed, the power of the host is reduced while the computer system is kept in the same power sate.

2. The power management method according to claim 1, wherein the step of determining whether to execute the power saving program comprises:

detecting a load state of the host; and determining whether to execute the power saving program according to the load state, wherein when the load state exceeds a preset value, the power saving program is not executed.

3. The power management method according to claim 1, wherein the step of determining whether to execute the power saving program comprises:

determining whether a display signal generated by the host is outputted to an external monitor, wherein when the display signal is outputted to the external monitor, the power saving program is not executed.

4. The power management method according to claim 1, wherein the step of determining whether the main monitor is turned off or not comprises:

determining whether the main monitor continues turned off over a preset time.

5. The power management method according to claim 1, wherein the step of executing the power saving program at least comprises one of the following steps:

reducing an operating frequency of a central processing unit (CPU) of the host;

reducing an operating voltage of the CPU;

reducing an operating frequency of a chipset of the host; and turning off a power source of a peripheral device of the host.

6. A computer system, operating under different power states, comprising:

a main monitor; and a host with an embedded controller coupled to the main monitor, wherein the embedded controller is used for determining whether the main monitor is turned off or not, and when the embedded controller determines that the main monitor is turned off, the embedded controller determines whether to execute a power saving program, and when the power saving program is determined to be executed, the embedded controller executes a power saving program to reduce the power of the host while the computer system is kept in the same power sate.

7. The computer system according to claim 6, wherein the embedded controller determines whether to execute the power saving program according to a load state of the host, and when the embedded controller determines the load state exceeds a preset value, the power saving program is not executed.

8. The computer system according to claim 6, wherein the host further comprises a display chip coupled to the main monitor and the embedded controller, the display chip is used for outputting a display signal to the main monitor or an external monitor, the embedded controller determines whether the display signal is outputted to the external monitor, and when the display signal is outputted to the external monitor, the embedded controller does not execute the power saving program.

9. The computer system according to claim 6, wherein the embedded controller executes the power saving program after determining that the main monitor continues off over a preset time.

10. The computer system according to claim 8, wherein the host further comprises:
- a CPU coupled to the embedded controller;
- a chipset coupled to the embedded controller; and
- a peripheral device coupled to the embedded controller, wherein when the embedded controller executes the power saving program, at least one of the following steps is executed:
  - reducing the operating frequency of the CPU;
  - reducing the operating voltage of the CPU;
  - reducing the operating frequency of the chipset; and
  - turning off the power source of the peripheral device.

\* \* \* \* \*